(12) United States Patent
Nishifukumoto et al.

(10) Patent No.: US 8,901,785 B2
(45) Date of Patent: Dec. 2, 2014

(54) ELECTRIC MOTOR COMPRISING IRON CORE HAVING PRIMARY TEETH AND SECONDARY TEETH

(71) Applicant: FANUC Corporation, Minamitsuru-gun, Yamanashi (JP)

(72) Inventors: Akira Nishifukumoto, Yamanashi (JP); Takuya Maeda, Yamanashi (JP); Yoshifumi Shimura, Yamanashi (JP)

(73) Assignee: FANUC Corporation, Minamitsuru-gun, Yamanashi (JP)

(\*) Notice: Subject to any disclaimer, the term of this patent is extended or adjusted under 35 U.S.C. 154(b) by 50 days.

(21) Appl. No.: 13/738,041

(22) Filed: Jan. 10, 2013

(65) Prior Publication Data
US 2013/0181547 A1 Jul. 18, 2013

(30) Foreign Application Priority Data
Jan. 13, 2012 (JP) ................................. 2012-005321

(51) Int. Cl.
| | | |
|---|---|---|
| *H02K 41/03* | (2006.01) | |
| *H02K 1/06* | (2006.01) | |
| *H02K 21/16* | (2006.01) | |
| *H02K 35/04* | (2006.01) | |
| *H02K 3/12* | (2006.01) | |

(52) U.S. Cl.
CPC .............. *H02K 35/04* (2013.01); *H02K 41/031* (2013.01); *H02K 21/16* (2013.01); *H02K 2213/03* (2013.01); *H02K 3/12* (2013.01)
USPC .................................. 310/12.18; 310/216.074

(58) Field of Classification Search
None
See application file for complete search history.

(56) References Cited

U.S. PATENT DOCUMENTS

| | | | | |
|---|---|---|---|---|
| 7,205,694 | B2 * | 4/2007 | Mecrow | 310/168 |
| 7,432,623 | B2 * | 10/2008 | Ritz, Jr. et al. | 310/156.36 |
| 2004/0207286 | A1 * | 10/2004 | Bales et al. | 310/268 |
| 2005/0173991 | A1 | 8/2005 | Watarai et al. | |
| 2010/0013327 | A1 * | 1/2010 | Hoppe | 310/12.25 |

FOREIGN PATENT DOCUMENTS

| | | | | |
|---|---|---|---|---|
| JP | 55-068871 | | 5/1980 | |
| JP | 10-511837 | | 11/1998 | |
| JP | 2004-187488 | A | 7/2004 | |
| JP | 2004187488 | A * | 7/2004 | H02K 1/14 |
| JP | 2009-542167 | | 11/2009 | |
| JP | 2010-148167 | | 7/2010 | |
| WO | WO 2004-093301 | | 10/2004 | |

\* cited by examiner

*Primary Examiner* — Tran Nguyen
(74) *Attorney, Agent, or Firm* — Drinker Biddle & Reath LLP

(57) ABSTRACT

An electric motor includes a rotor including an iron core and a plurality of windings, and a stator including a plurality of permanent magnets forming a plurality of poles. The iron core has a plurality of primary teeth around each of which a winding is wound and a plurality of secondary teeth around each of which no winding is wound. The primary teeth and the secondary teeth are formed alternately with each other. The electric motor is configured such that a ratio between the number of poles formed by the permanent magnets of the stator and the number of phases formed by the windings of the rotor is 4m:3n (m and n are any natural numbers, excluding the case where m:n=2:3 is satisfied).

6 Claims, 6 Drawing Sheets

ELECTRIC MOTOR COMPRISING IRON CORE HAVING PRIMARY TEETH AND SECONDARY TEETH

RELATED APPLICATION DATA

This application claims priority under 35 U.S.C. §119 and/or §365 to Japanese Application No. 2012-005321 filed Jan. 13, 2012, the entire contents of which are incorporated herein by reference.

BACKGROUND OF THE INVENTION

1. Field of the Invention

The present invention relates to an electric motor that comprises an iron core having primary teeth around each of which a winding is wound, and secondary teeth around each of which no winding is wound.

2. Description of the Related Art

An electric motor that comprises an iron core having primary teeth around each of which a winding is wound, and secondary teeth around each of which no winding is wound is known. (See Published Japanese Translation of PCT Application No. 10-511837 and Japanese Unexamined Patent Publication No. 2004-187488.)

In the electric motor that comprises the iron core having the primary teeth and the secondary teeth, there is a need to further increase thrust.

SUMMARY OF THE INVENTION

According to a first invention in the present application, an electric motor comprising: a first electric motor element that comprises an iron core and a plurality of windings; and a second electric motor element that comprises a plurality of permanent magnets forming a plurality of poles and that is oppositely situated against the first electric motor element, wherein the plurality of windings of the first electric motor element are configured such that, when three-phase alternating current is supplied, they cooperate with the plurality of permanent magnets of the second electric motor element to generate thrusts of the electric motor, wherein, the iron core has a plurality of teeth that project toward the second electric motor element, the plurality of teeth including primary teeth around each of which a winding is wound and secondary teeth around each of which no winding is wound, these primary teeth and secondary teeth being situated alternately with each other, and wherein a ratio between the number of poles formed by the plurality of permanent magnets of the second electric motor element and the number of phases formed by the plurality of windings of the first electric motor element is 4m:3n (m and n are any natural numbers, excluding the case where m:n=2:3 is satisfied), is provided.

According to a second invention in the present application, in the first invention, the electric motor wherein a ratio between the number of the poles and the number of the phases is 4:3 is provided.

According to a third invention in the present application, in the first or second invention, the electric motor wherein a width of the secondary teeth is ¼ or less of a width of the primary teeth in a direction in which thrust is generated is provided.

According to a fourth invention in the present application, in any of the first to third inventions, the electric motor wherein at least one of the first electric motor element and the second electric motor element is movable is provided.

According to a fifth invention in the present application, in any of the first to fourth inventions, the electric motor wherein the primary teeth and the secondary teeth have constant widths in a direction projecting toward the second electric motor element is provided.

According to a sixth invention in the present application, in any of the first to fifth inventions, the electric motor wherein the primary teeth and the secondary teeth have tip positions that are aligned in a direction projecting toward the second electric motor element is provided.

According to a seventh invention in the present application, in any of the first to sixth inventions, the electric motor that is a linear electric motor is provided.

According to an eighth invention in the present application, in any of the first to sixth inventions, the electric motor that is a rotational electric motor is provided.

These and other objects, features and advantages of the present invention will be more apparent in light of the detailed description of exemplary embodiments thereof as illustrated in the drawings.

DETAILED DESCRIPTION

Hereinafter, embodiments of the present invention will be described with reference to the accompanying drawings. In the illustrated embodiments, for convenience of description, elements may be accordingly modified in scale from the practical application.

Figure 1:
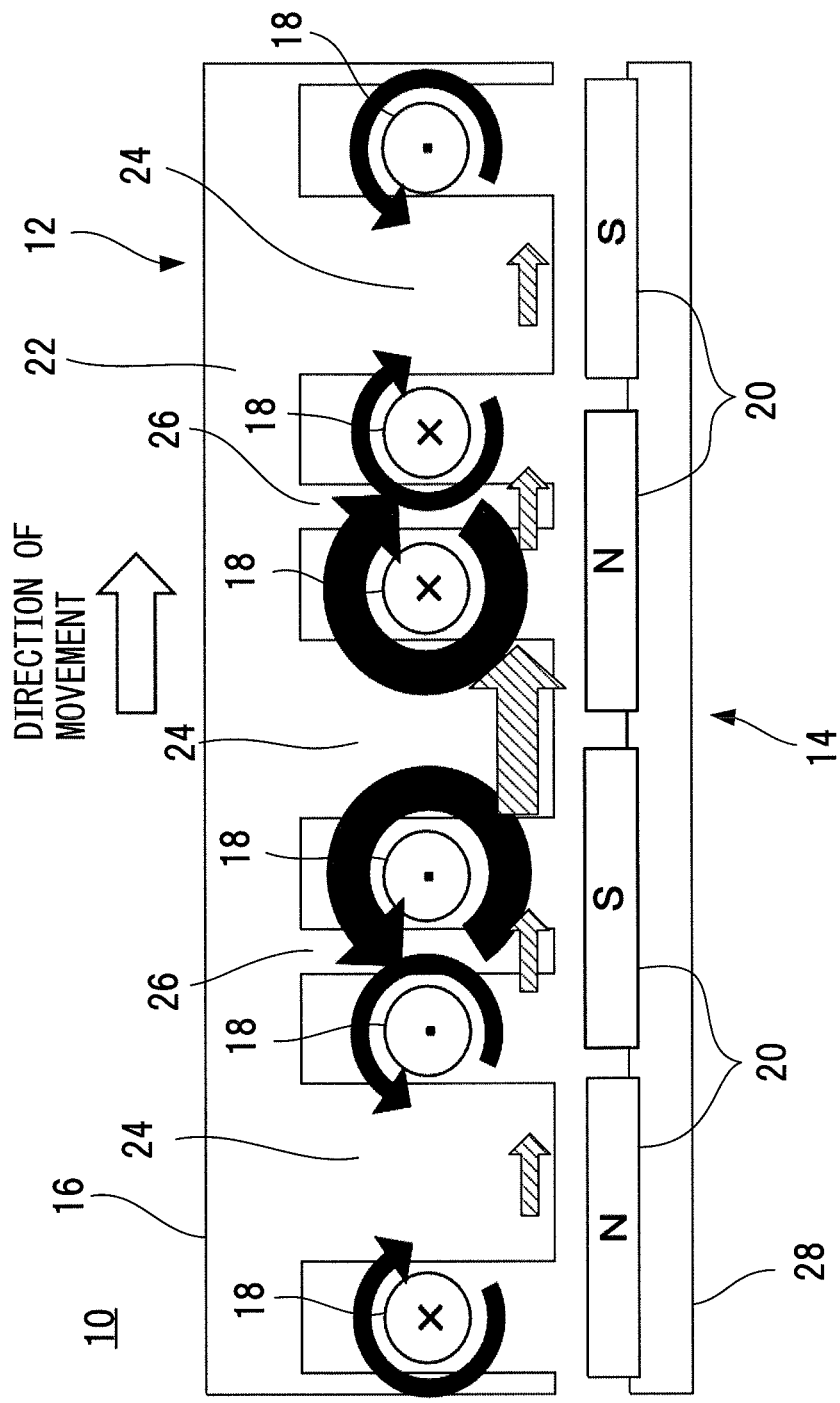
FIG. 1 is a schematic view illustrating a rotor and a stator in a linear electric motor according to an embodiment of the present invention.

FIG. 1 is a schematic view illustrating a rotor 12 and a stator 14 in a linear electric motor 10 according to an embodiment of the present invention. Further, FIG. 1 conceptually indicates directions of lines of magnetic force, strengths of magnetic fields and directions and magnitudes of thrusts generated at a given current phase in the linear electric motor 10 that is configured as a four-pole three-phase electric motor.

The rotor 12 is a first electric motor element including an iron core 16 and three windings 18. The stator 14 is a second electric motor element that includes four permanent magnets 20 forming four poles and that is oppositely disposed against the rotor 12. The iron core 16 of the rotor 12 has a substantially rectangular core back 22 that extends in a longitudinal direction of the linear electric motor 10, and a plurality of teeth that project from the core back 22 toward the stator 14. The teeth include a plurality of primary teeth 24 around each of which a winding 18 is wound, and a plurality of secondary teeth 26 around each of which no winding is wound. The primary teeth 24 and secondary teeth 26 are arranged alternately with each other.

Although each winding 18 is actually wound around the primary tooth 24 along a height portion of the primary tooth 24 (a portion that projects from the core back 22) by concentrated winding, for example, the windings 18 are illustrated only conceptually in FIG. 1. The winding 18 is formed to maximize the number of turns so that magnetic effects can be improved. The winding 18 is preferably wound so that it has a sufficient number of turns to make contact with the secondary tooth 26 that is at a predetermined distance from adjacent the primary tooth 24. When the windings 18 and the secondary teeth 26 are in contact with each other, heat generated in the windings 18 during energization is transferred through the secondary teeth 26 so that heat dissipation effect can be improved.

The windings 18 of the rotors 12 are configured so that, when three-phase alternating current is supplied, they cooperate with a plurality of permanent magnet 20 of the stator 14 to generate thrust of the linear electric motor 10. Each winding 18 is illustrated either as a circle with a small black spot or as a circle with a letter "X." The black spot and the letter "X" represent a direction in which electric current flows in the windings 18. More specifically, in the windings 18 shown by the circles with the black spots, electric current flows toward the near side in relation to the drawing surface. On the other hand, in the windings 18 shown by the circles with the letter "X," electric current flows toward the far side in relation to the drawing surface.

The direction of a blackened annular arrow depicted around each winding 18 represents a direction in which a corresponding line of magnetic force is oriented. Further, the width of each annular arrow represents a strength of a corresponding magnetic field. More specifically, the strength of the magnetic field generated by the winding 18 corresponding to the wider annular arrow is two times greater than that generated by the winding 18 corresponding to the narrower annular arrow. This relationship is satisfied when three-phase alternating current is supplied to windings 18. The magnetic fields generated by the windings 18 cause magnetic fluxes to be generated in the teeth. In FIG. 1, the primary tooth 24 situated at the center of the rotor 12 is under influence of the magnetic fields corresponding to the two wider annular arrows from the windings 18 and 18 that are adjacent to the both sides of the primary tooth 24. In contrast, in the secondary teeth 26 and 26 at the both sides of the center primary tooth 24, magnetic fields from the windings 18 and 18 that are adjacent to the both sides of these secondary teeth 26 and 26 are cancelled by each other. As a result, these secondary teeth 26 and 26 are subject to the magnetic fields corresponding to one narrower annular arrow. The magnitude of magnetic flux generated in the primary tooth 24 at the center is therefore four times greater than that generated in the secondary teeth 26 and 26.

In this embodiment, the primary teeth 24 and the secondary teeth 26 have constant widths, respectively, in the direction projecting from the core back 22 toward the stator 14. In other words, on the drawing surface, the primary teeth 24 and the secondary teeth 26 have a rectangular shape, respectively. The magnitudes of magnetic fluxes passing through the primary teeth 24 and the secondary teeth 26, respectively, substantially depend on the widths of the teeth in a direction perpendicular to a directions in which the magnetic fluxes advances. Thus, in the primary teeth 24 and the secondary teeth 26 according to this embodiment, the magnetic fluxes passing through these teeth are equalized as a whole. As a result, the flux density is relatively reduced, so as to reduce core loss and increase rated output.

Further, in this embodiment, the primary teeth 24 and the secondary teeth 26 are formed such that the positions of their tips are aligned with each other in a direction projecting toward the stator 14. By aligning the positions of the tips of the secondary teeth 26 relative to those of the primary teeth 24, the thrusts generated by the primary teeth 24 and those generated by the secondary teeth 26 can be appropriately balanced. The tips of the primary teeth 24 and of the secondary teeth 26 are positioned so that they can be situated as close as possible to the permanent magnets 20, since the shorter the distance between the primary teeth 24/secondary teeth 26 and the permanent magnets 20, the greater the thrusts can be obtained.

The stator 14 includes a field yoke 28 that extends in a longitudinal direction of the linear electric motor 10, and a plurality of permanent magnets 20 situated along the field yoke 28. The permanent magnets 20 are magnetized so that their ends that face toward the rotor 12 form either N pole or S pole. These permanent magnets 20 are arranged alternately so that the adjacent permanent magnets 20 have opposite magnetization directions relative to each other.

As described above, in the linear electric motor 10, thrust of the rotor 12 is obtained by the cooperation between the windings 18 of the rotor 12 and the permanent magnets 20 of the stator 14. In FIG. 1, hatched arrows provided near the tips of the primary teeth 24 and the secondary teeth 26 represent directions and magnitudes of the thrusts generated in the teeth. Specifically, the wider the arrows, the greater the thrusts can be obtained. Further, a whitened arrow illustrated in the figure represents a direction in which the linear electric motor 10 moves. The thrust generated in the linear electric motor 10 substantially depends on a relative positional relationship between the primary teeth 24 or the secondary teeth 26 and the permanent magnets 20. Specifically, when the primary teeth 24 or the secondary teeth 26 face and the permanent magnet 20 are positioned so as to be face to face, only force (either repulsive force or attractive force) in a direction perpendicular to the direction of movement is generated and substantially no thrust is generated in the direction of movement of the rotor 12. In contrast, when the primary teeth 24 or the secondary teeth 26 is positioned to be opposite to the clearance between poles of the adjacent permanent magnets 20, the magnetic fluxes are bent toward the direction of movement and, therefore, greater thrusts are generated. In the four-pole three-phase linear electric motor 10 illustrated in FIG. 1, the primary teeth 24 or the secondary teeth 26 is more frequently positioned so as to be opposite to the clearance between poles of the adjacent permanent magnets 20, thrusts can be therefore obtained more efficiently.

In the linear electric motor 10 including the secondary teeth 26 as well as the primary teeth 24, when it is configured so that a ratio of the number of poles formed by the permanent magnets 20 of the stator 14 and the number of phases formed by the windings 18 of the rotor 12 is 4m:3n, the thrust of the linear electric motor 10 can also be generated by the secondary teeth 26. In other words, the thrusts generated by the secondary teeth 26 are oriented to direction identical to those generated by the primary teeth 24. The letters m and n are natural numbers, and the case where m:n=2:3 is satisfied is excluded. Other embodiments in which the ratio between the pole and the phase satisfies the above relationship will be described later.

Figure 6:
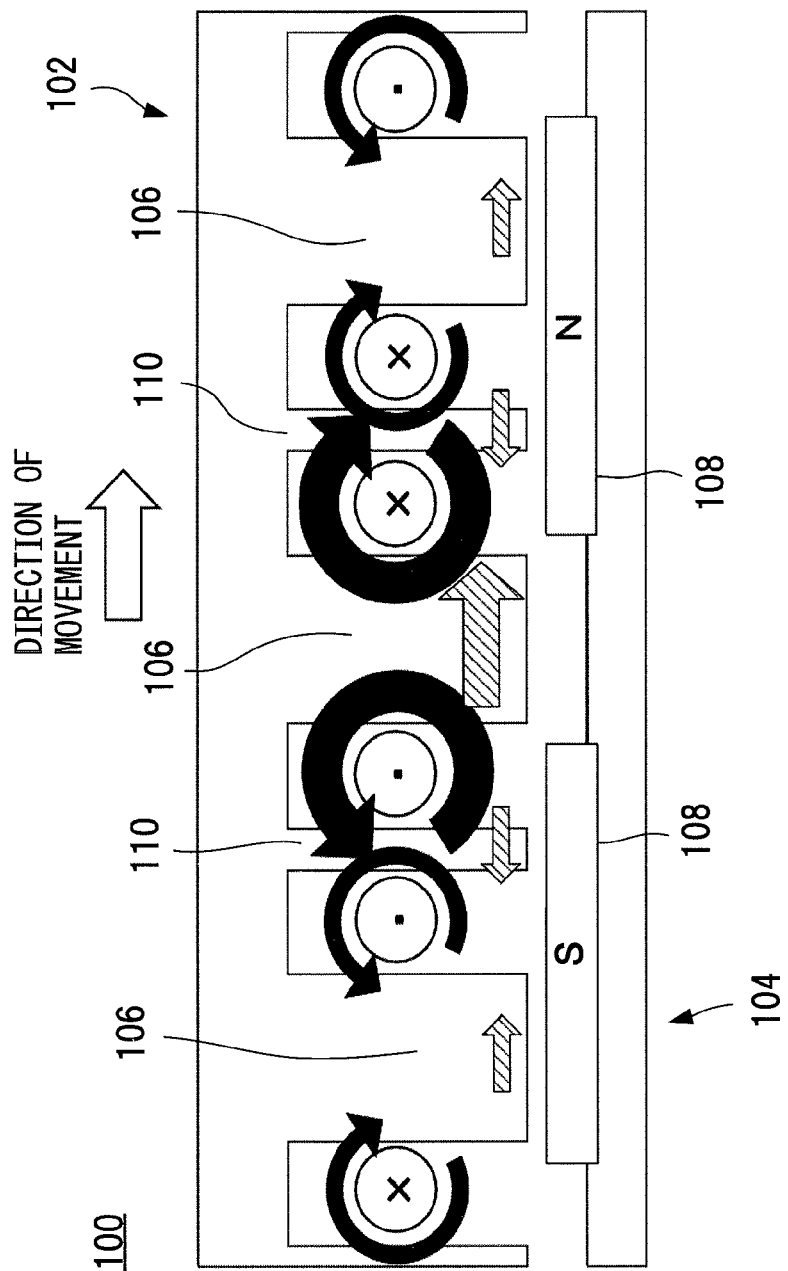
FIG. 6 is a schematic view illustrating a rotor and a stator in a linear electric motor according to a comparative example.

FIG. 6 is a schematic view illustrating a rotor 102 and a stator 104 in a linear electric motor 100 according to a comparative example. As illustrated in the figure, the linear electric motor 100 has a two-pole three-phase configuration. Thus, three primary teeth 106 are formed on the rotor 102 and permanent magnets 108 that form two poles are arranged in the stator 104. Also in this figure, similarly to FIG. 1, directions of lines of magnetic force, strengths of magnetic fields and directions and magnitudes of thrusts are conceptually shown by the similar arrows. In this comparative example, due to the positional relationship between the poles and the phases, in the secondary teeth 110, thrusts are generated in the direction opposite to that of movement of the linear electric motor 100. Thus, the force is generated in the direction so as to prevent the movement of the linear electric motor 100. As a result, in this comparative example, in order to increase the thrust, it is desired that no secondary teeth 110 are provided.

Returning to FIG. 1, in the linear electric motor 10, the secondary teeth 26 also contribute to generating the thrust of the rotor 12. In the linear electric motor 10 having this configuration, magnetic fluxes pass through both the primary teeth 24 and the secondary teeth 26. However, as the increased amount of magnetic fluxes passes through the secondary teeth 26, magnetic saturation tends to occur, which decreases the thrusts. Accordingly, it is preferable to adjust the tooth width ratio between the primary teeth 24 and the secondary teeth 26 in consideration of effects of magnetic saturation in the secondary teeth 26. As described above, in this embodiment, the amount of magnetic fluxes in the primary teeth 24 is four times greater than that in the secondary teeth 26. Therefore, the effects of magnetic saturation can be effectively reduced if the width of the secondary teeth 26 is ¼ or less of that of the primary teeth 24.

Figure 2:
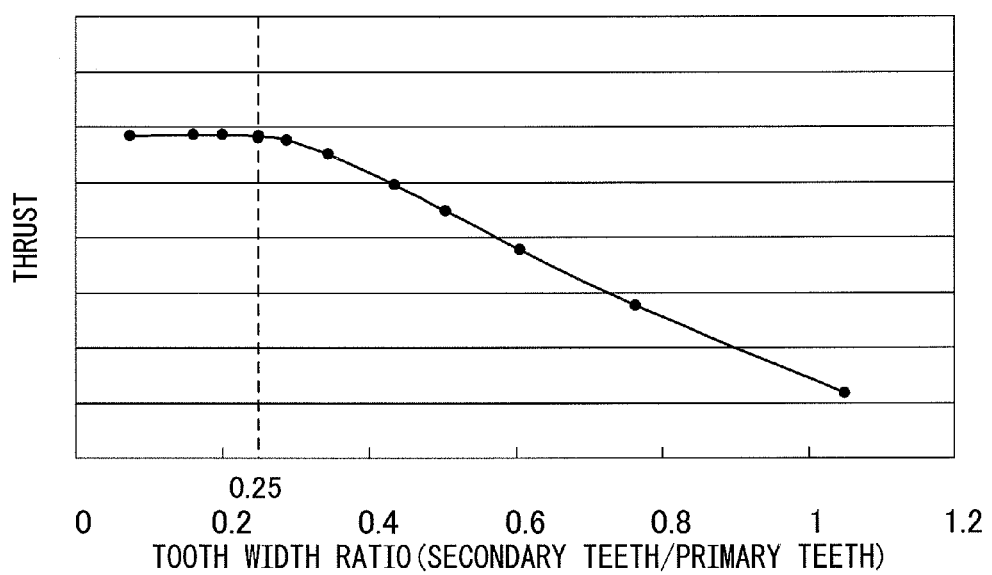
FIG. 2 is a graph illustrating a relationship between a primary/secondary tooth width ratio and thrust generated in the linear electric motor of FIG. 1.

FIG. 2 is a graph illustrating a relationship between a tooth width ratio of the primary teeth 24 and the secondary teeth 26 and a thrust in the linear electric motor 10 of FIG. 1. In this graph, the horizontal axis represents the tooth width ratio (a width of the secondary teeth 26/a width of the primary teeth 24) and the vertical axis represents the sum of the thrusts that is borne by the rotor 12 as a whole at a given phase. As apparent from FIG. 2, when the tooth width ratio is about 0.25 (the width of the secondary teeth 26 is ¼ of that of the primary teeth 24), the thrust has a maximum value. Further, it is to be understood that in the range where the tooth width ratio is less than 0.25, the thrust is substantially constant. Although the lowest limit value of the tooth width ratio is not particularly determined for the purpose of increasing the thrust, it may be appropriately chosen by a person skilled in the art in consideration of structural strength of the secondary teeth 26 or other design requirements. On the other hand, as described above, when the secondary teeth 26 is formed so as to make contact with the windings 18, better heat dissipation effect can be achieved. In addition, as the width of the secondary teeth 26 becomes larger, the heat dissipation effect is improved. Accordingly, in order to satisfy both purposes of increasing the thrust and of improving the heat dissipation effect, the secondary teeth 26 may be formed so as to have a width that is ¼ of that of the primary teeth 24. In particular, when large current that tends to cause magnetic saturation in the iron core 16 is applied, it is preferable to set the tooth width ratio to ¼.

Although FIG. 2 shows correlation between the tooth width ratio and the thrust at a given phase, this correlation is satisfied in any other phases as well. Due to the shape of the teeth and slots and other factors, it is difficult to always keep the magnitude of the thrust constant at various phases. However, it has been found that the correlation between the tooth width ratio and the thrust yields substantially the same result as illustrated in FIG. 2.

Hereinafter, other embodiments of the present invention will be described. Elements that are identical or corresponding to those according to the embodiment described above are designated with the same reference numerals. Redundant descriptions are omitted accordingly.

Figure 3:
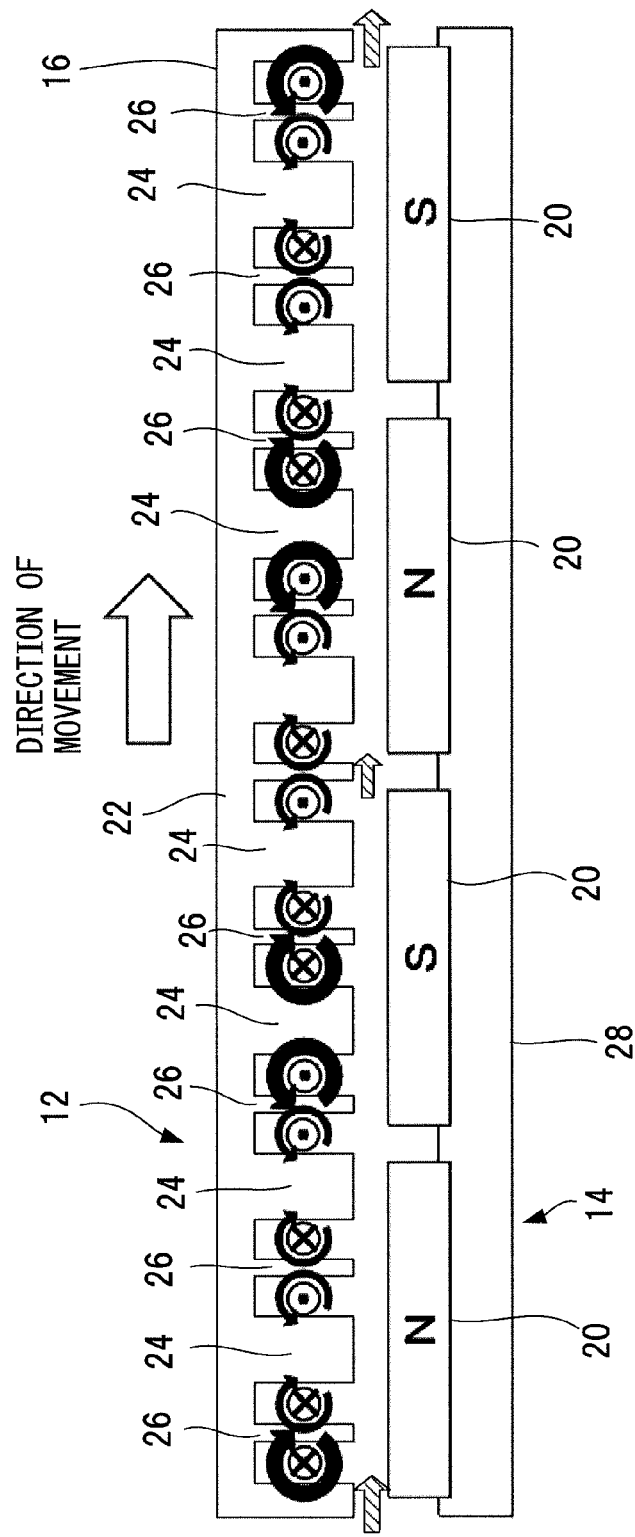
FIG. 3 is a schematic view illustrating a rotor and a stator in a linear electric motor according to another embodiment of the present invention.

FIG. 3 is a schematic view illustrating a rotor 12 and a stator 14 in a linear electric motor 40 according to another embodiment of the present invention. In this embodiment, the linear electric motor 40 is configured as a four-pole nine-phase electric motor. Specifically, four permanent magnets 20 that form a pole, respectively, are arranged in the stator 14. Further, the rotor 12 has nine primary teeth 24 and windings 18 are wound around each primary tooth 24 to form a phase, respectively. Similarly to FIG. 1, FIG. 3 conceptually shows directions of lines of magnetic force, strengths of magnetic fields and directions and magnitudes of thrusts generated at a given current phase by similar arrows to those in FIG. 1. Hatched arrows are depicted to indicate a direction and magnitude of thrusts at the primary teeth 24 and the secondary teeth 26 positioned such that the thrusts for the linear electric motor 40 are most effectively generated, i.e., positioned so as to be opposite to the clearance between poles of the stator 14. As apparent from FIG. 3, the direction of the thrust obtained by the primary teeth 24 coincides with that obtained by the secondary teeth 26. Thus, in this embodiment, similarly to the embodiment described above, the secondary teeth 26 apply the thrust to the rotor 12 in the direction of movement. As a result, the thrust of the rotor 12 increases as a whole. Further, also in this embodiment, when a ratio between the width of the primary teeth 24 and the width of the secondary teeth 26, i.e., the tooth width ratio is set to ¼ or less, the thrust has a maximum value.

Figure 4:
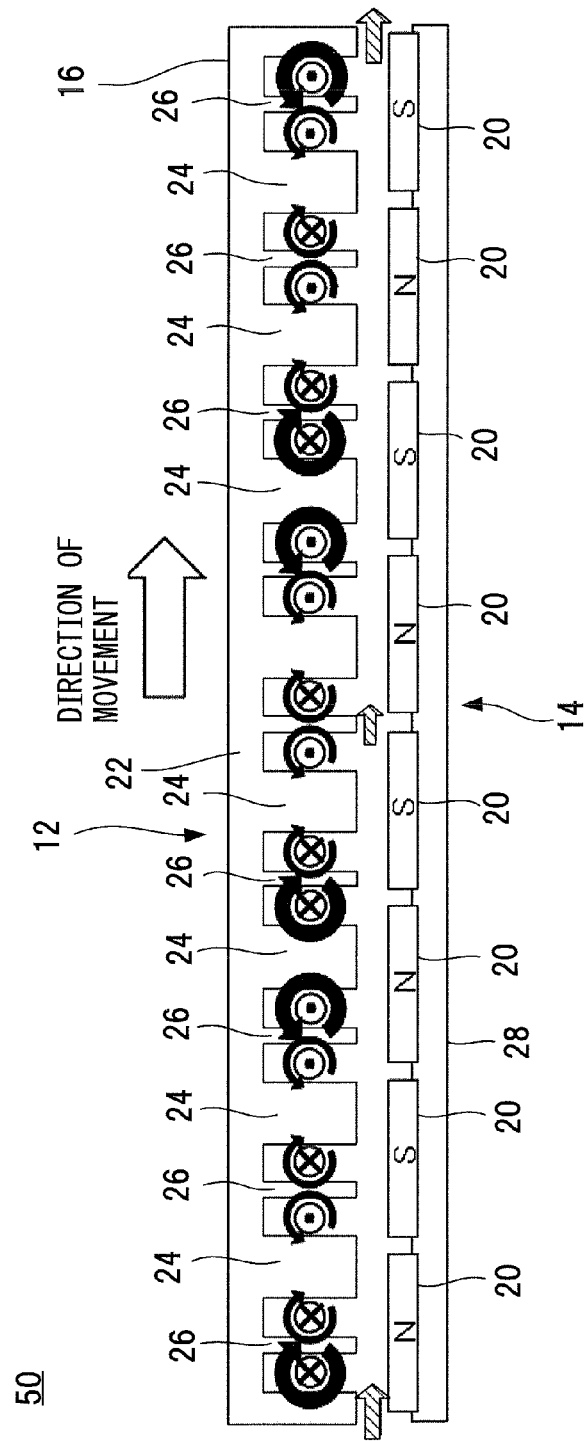
FIG. 4 is a schematic view illustrating a rotor and a stator in a linear electric motor according to yet another embodiment of the present invention.

FIG. 4 is a schematic view illustrating a rotor 12 and a stator 14 of a linear electric motor 50 according to yet another embodiment of the present invention. In this embodiment, the linear electric motor 50 is configured as an eight-pole nine-phase electric motor. Thus, eight permanent magnets 20 that form a pole, respectively, are arranged in the stator 14. Further, the rotor 12 has nine primary teeth 24 and windings are wound around each primary tooth 24 to form a phase, respectively. Further, FIG. 4 conceptually shows directions of lines of magnetic force, strengths of magnetic fields and directions and magnitudes of thrusts generated at a given current phase by similar arrows to those in FIG. 1. Hatched arrows are depicted to indicate a direction and magnitude of thrusts with respect to the primary teeth 24 and the secondary teeth 26 positioned such that the thrusts for the linear electric motor 50 are most effectively generated, i.e., positioned so as to be opposite to the clearance between poles of the stator 14. As apparent from FIG. 4, the direction of the thrust obtained by the primary teeth 24 coincides with that obtained by the secondary teeth 26. Thus, in this embodiment, similarly to the embodiment described above, the secondary teeth 26 apply the thrust to the rotor 12 in the direction of movement and, therefore, the thrust of the rotor 12 increases as a whole. Further, also in this embodiment, when a ratio between the width of the primary teeth 24 and the width of the secondary teeth 26, i.e., the tooth width ratio is set to ¼ or less, the thrust has a maximum value.

Figure 5:
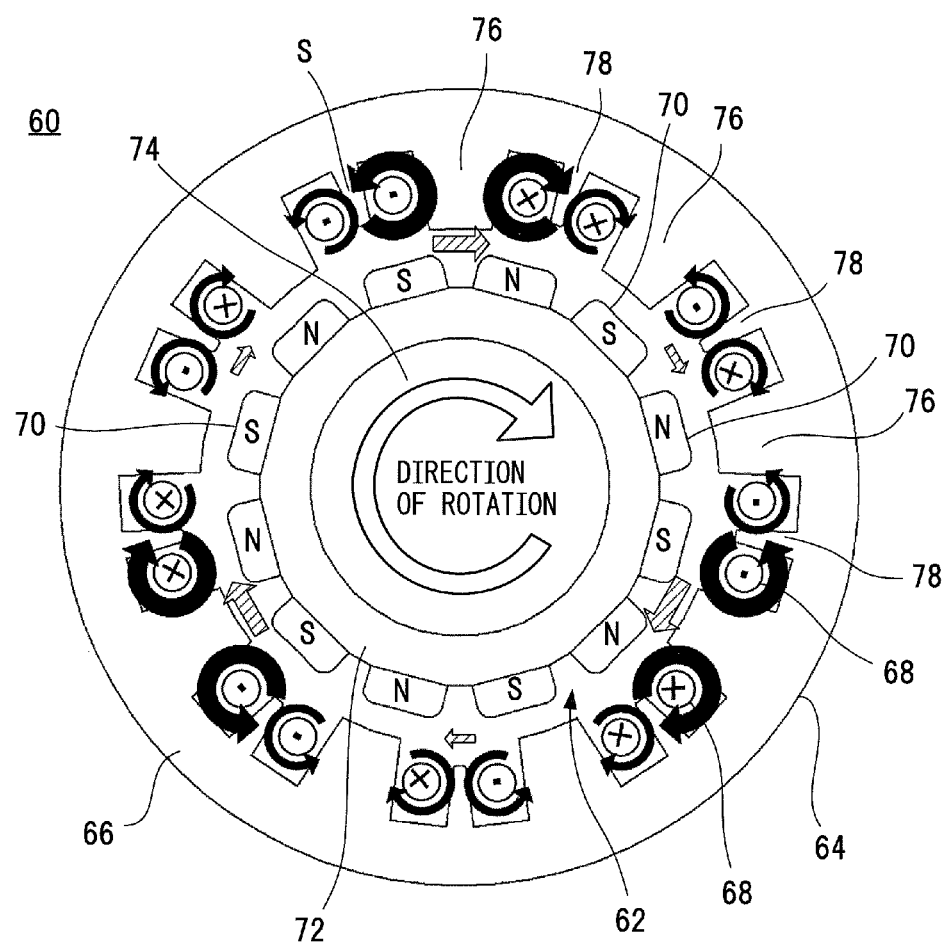
FIG. 5 is a schematic view illustrating a rotor and a stator in a rotational electric motor according to an embodiment of the present invention.

FIG. 5 is a schematic view illustrating a rotor 62 and a stator 64 of a rotational electric motor 60 according to an embodiment of the present invention. In this embodiment, the concepts of the present invention described above are applied to a rotational electric motor. In this embodiment, the rotational electric motor 60 is configured as a twelve-pole nine-phase electric motor. The stator 64 is a first electric motor element that includes an iron core 66 and a plurality of windings 68. The rotor 62 is a second electric motor element that includes a plurality of permanent magnets 70 forming a plurality of poles and that is oppositely disposed against the stator 64.

The rotor 62 mainly includes a field yoke 72, and permanent magnets 70 that are arranged on an outer circumference of the field yoke 72 substantially at an equal interval in a circumferential direction. The field yoke 72 is integrally attached to a rotational shaft 74 of the rotational electric motor 60 such that rotational power is transferred to the rotational shaft 74. A whitened arrow in the figure represents a rotational direction of the rotational electric motor 60.

The iron core 66 of the stator 64 has an annular body form substantially disposed along an outer circumference of the rotor 62. The iron core 66 has a plurality of teeth integrally formed to the iron core 66 and inwardly projecting from an inner circumferential surface of the iron core 66 toward the rotor 62. The plurality of teeth include primary teeth 76 around each of which a winding 68 is wound, and a plurality of secondary teeth 78 around each of which no winding is wound. In the inner circumferential direction of the stator 64, the primary teeth 76 and the secondary teeth 78 are arranged alternately with each other, similarly to the embodiments described above.

In FIG. 5, blackened arrows depicted around each winding 68 also conceptually represent directions of lines of magnetic force and strengths of magnetic fields at a given current phase. Hatched arrows conceptually represent directions and magnitudes of thrusts. As illustrated, also in this embodiment, the thrust generated by the secondary teeth 78 is oriented toward the same direction as the thrust generated by the primary teeth 76. Thus, the secondary teeth 78 function to apply power to rotate the rotor 62 in a predetermined rotational direction. In the rotational electric motor 60, similarly to the linear electric motors 10, 40 and 50 described above, when a ratio of the number of poles formed by the permanent magnets 70 and the number of phases formed by the windings 68 is 4m:3n, the thrusts generated by secondary teeth 78 are oriented in the direction identical to those generated by the primary teeth 76. The letters m and n are any natural numbers, the case where m:n=2:3 is satisfied is excluded.

Also in this embodiment, the windings 68 are supplied with three-phase alternating current. Therefore, similarly to the linear electric motors 10, 40 and 50 described above, the thrust applied to the rotor 62 has a maximum value, when the tooth width ratio (the width of the secondary teeth 78/the width of the primary teeth 76) is 0.25 or less.

In the above embodiments, one electric motor element is a rotor and the other electric motor element is a stator. However, a person skilled in the art can choose which motor element should be configured as a rotor. Accordingly, the present invention is not limited to the above-described or illustrated embodiments. For example, two electric motor elements may be configured such that both of the electric motor elements are movable relative to each other.

Further, the present invention may be applied in the same way to either a linear electric motor or a rotational electric motor. Therefore, the matters that have been described in relation to the linear electric motor are also applied to the case when the present invention is embodied as a rotational electric motor. For example, when the present invention is embodied as a rotational electric motor, the primary teeth and secondary teeth may be configured such that the width of the primary teeth and the secondary teeth are uniform in the projecting direction, and/or, for example, such that the tip positions of the primary teeth and secondary teeth are aligned in the projecting direction.

Effects of the Invention

According to the first invention, the thrusts generated by the secondary teeth are oriented to the same direction as the thrusts generated by the primary teeth. As a result, the thrust of the electric motor can be obtained by not only the primary teeth but also by the secondary teeth, and therefore, an electric motor that has large thrust can be provided.

According to the second invention, the teeth are more frequently positioned to be opposite to the clearance between adjacent poles of the permanent magnets, where the thrust can be generated most effectively. As a result, an electric motor that can increase the thrust more efficiently can be provided.

According to the third invention, the tooth width ratio is determined so that the balance of magnetic saturation between the primary teeth and the secondary teeth can be properly maintained. As a result, an electric motor that has large thrust can be provided.

According to the fourth invention, either one of or both of the first electric motor element and the second electric motor element is configured as a movable element. Therefore, an electric motor can be applied as necessary.

According to the fifth invention, the magnetic flux density passing through teeth becomes uniform in the projecting direction of the teeth. As a result, the magnetic flux can be prevented from concentrating and an electric motor that can reduce core loss and increase rated output can be provided.

According to the sixth invention, the clearance between the secondary teeth and the permanent magnets can be minimized. As a result, the thrusts generated by the secondary teeth can be maximized, and an electric motor that has large thrust can be provided.

According to the seventh invention, a linear electric motor having the advantages according to any of the first to sixth inventions described above can be provided.

According to the eighth invention, a rotational electric motor having the advantages according to any of the first to sixth inventions described above can be provided.

Although the invention has been shown and described with exemplary embodiments thereof, it should be understood by those skilled in the art that the foregoing and various other changes, omissions and additions may be made therein and thereto without departing from the spirit and the scope of the invention.

What is claimed is:

1. An electric motor comprising:
   a first electric motor element that comprises an iron core and a plurality of windings; and
   a second electric motor element that comprises a plurality of permanent magnets forming a plurality of poles and that is oppositely situated against the first electric motor element, wherein
   the plurality of windings of the first electric motor element are configured such that, when three-phase alternating current is supplied, the plurality of windings cooperate with the plurality of permanent magnets of the second electric motor element to generate thrusts of the electric motor, wherein,
   the iron core has a plurality of teeth that project toward the second electric motor element, the plurality of teeth including primary teeth around each of which a winding is wound and secondary teeth around each of which no winding is wound, these primary teeth and secondary teeth being situated alternately with each other, and wherein
   a ratio between the number of poles formed by the plurality of permanent magnets of the second electric motor element and the number of phases formed by the plurality of windings of the first electric motor element is 4:3,
wherein the windings forming the phases are in contact with the secondary teeth, and
wherein a width of the secondary teeth is ¼ or less of a width of the primary teeth in a direction in which thrust is generated.

2. The electric motor according to claim 1, wherein at least one of the first electric motor element and the second electric motor element is movable.

3. The electric motor according to claim 1, wherein the primary teeth and the secondary teeth have constant widths in a direction projecting toward the second electric motor element.

4. The electric motor according to claim 1, wherein the primary teeth and the secondary teeth have tip positions that are aligned in a direction projecting toward the second electric motor element.

5. The electric motor according to claim 1, wherein the electronic motor is a linear electric motor.

6. The electric motor according to claim 1, wherein the electronic motor is a rotational electric motor.

* * * * *